(12) United States Patent
Rabsatt

(10) Patent No.: US 8,341,176 B1
(45) Date of Patent: Dec. 25, 2012

(54) STRUCTURE-BASED EXPANSION OF USER ELEMENT SELECTION

(75) Inventor: Kevin Rabsatt, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/481,289

(22) Filed: May 25, 2012

Related U.S. Application Data

(63) Continuation of application No. 12/247,430, filed on Oct. 8, 2008, now abandoned.

(51) Int. Cl.
*G06F 17/30* (2006.01)
(52) U.S. Cl. ........................ 707/767; 715/768
(58) Field of Classification Search ............. 707/791, 707/797, 803–804, 809, 759–760; 715/768
See application file for complete search history.

(56) References Cited

U.S. PATENT DOCUMENTS

| | | | |
|---|---|---|---|
| 7,315,852 | B2 | 1/2008 | Balmin et al. |
| 2002/0010625 | A1 | 1/2002 | Smith et al. |
| 2003/0105682 | A1 | 6/2003 | Dicker et al. |
| 2004/0019536 | A1 | 1/2004 | Ashkenazi et al. |
| 2008/0092034 | A1 | 4/2008 | Lim et al. |
| 2009/0248625 | A1 | 10/2009 | Adelman et al. |

OTHER PUBLICATIONS

Advisory Action for U.S. Appl. No. 12/247,430, mailed Jan. 17, 2012, 2 pages.
Non-Final Office Action Response for U.S. Appl. No. 12/247,430, filed Jul. 22, 2011, 23 pages.
Non-Final Office Action for U.S. Appl. No. 12/247,430, mailed Jan. 24, 2011, 17 pages.
Office Action Response for U.S. Appl. No. 12/247,430, filed Jan. 18, 2012, 3 pages.
Final Office Action for U.S. Appl. No. 12/247,430, mailed Oct. 25, 2011, 17 pages.
Notice of Allowance for U.S. Appl. No. 12/247,430, mailed Feb. 29, 2012, 13 pages.

*Primary Examiner* — Thu-Nguyet Le
(74) *Attorney, Agent, or Firm* — Brake Hughes Bellermann LLP

(57) ABSTRACT

Input indicating a first object within a set of structured data may be received. Input indicating a second object within the set of structured data may be received. Additional other objects within the set of structured data that are structurally similar to first and second objects may be determined based on metadata associated with the first object and based on metadata associated with the second object.

20 Claims, 12 Drawing Sheets

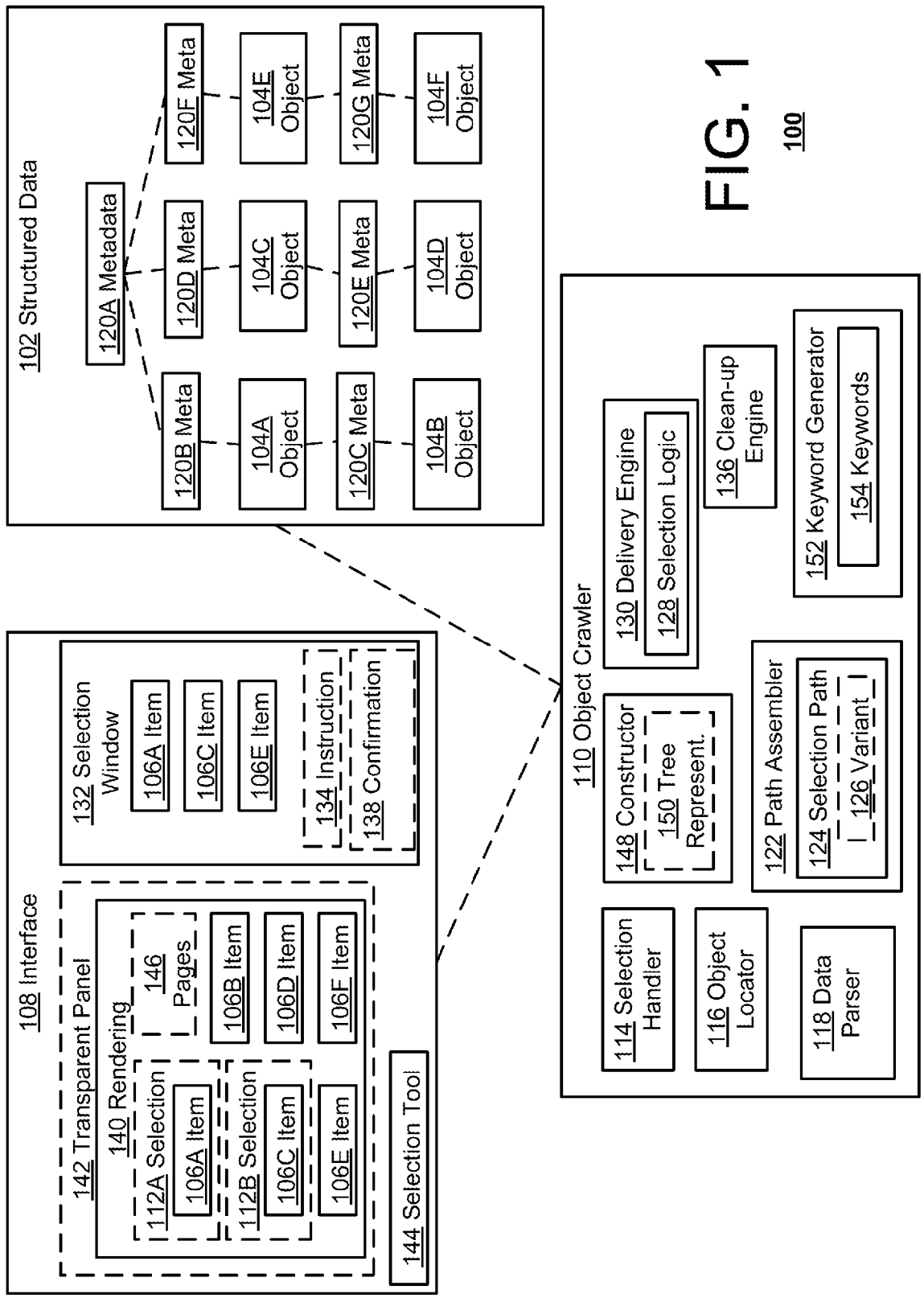

102 HTML Code (Structured Data)

```
<html>
<body>
<h1>Simple Product Catalog Page</h1>
Simple Example Products.
<table width=400px>
<tr valign=top>
<td>
<img src="productA.png">
</td>
<td>
<a href="details?id=0001"> Product A </a>
<p>
Description of Product A .
</p>
<td>
<a href="details?id=0001"> $10.99 </a>
</td>
</tr>
<tr valign=top>
<td>
<img src="productA.png">
</td>
<td>
<a href="details?id=0002"> Product B </a>
<p>
Description of Product B
</p>
<td>
<a href="details?id=0002"> $11.99 </a>
</td>
</tr>
<tr valign=top>
<td>
<img src="productC.png">
</td>
<td>
<a href="details?id=0003">Product C </a>
<p>
Description of Product C
</p>
<td>
<a href="details?id=0003"> $12.99 </a>
</td>
</td>
</tr>
</td>
</table>
</body>
</html>
```

120 (pointing to <body>)
208A (pointing to `<img src="productA.png">`)
202A (pointing to `<a href="details?id=0001"> Product A </a>`)
204A (pointing to Description of Product A)
206A (pointing to `<a href="details?id=0001"> $10.99 </a>`)

STRUCTURE-BASED EXPANSION OF USER ELEMENT SELECTION

CROSS REFERENCE TO RELATED APPLICATIONS

This application is a continuation of, and claims priority to, U.S. patent application Ser. No. 12/247,430, filed on Oct. 8, 2008, entitled "STRUCTURE-BASED EXPANSION OF USER ELEMENT SELECTION", the disclosure of which is incorporated by reference herein.

TECHNICAL FIELD

This description relates to identifying similarly structured objects.

BACKGROUND

Online advertising campaigns have taken prominence in the marketing strategies of many companies. Determining the products, items or other keywords around which to centralize or focus an advertising campaign can be a time-consuming process. For example, a company offering for sale hundreds, if not thousands of products may decide to use the names of each product as keywords in the marketing campaign. In such a situation, it would be a burden for a campaign designer to scroll through each product offering and individually copy and paste the product names into a separate spreadsheet or other campaign management program.

SUMMARY

In an example embodiment, a computer-implemented method is disclosed. Input indicating a first object within a set of structured data may be received. Input indicating a second object within the set of structured data may be received. Additional other objects within the set of structured data that are structurally similar to first and second objects may be determined based on metadata associated with the first object and based on metadata associated with the second object.

In another example embodiment, method of generating keywords for an on-line advertising campaign for a retailer is disclosed. Informational content about a plurality of products sold by the retailer wherein each product is associated with one or more identifiers may be displayed in a browser window, based on a set of structured data. Input may be received from a user indicating a first identifier of a first product displayed in the browser window. Input may be received from a user indicating a second identifier of a second product displayed in the browser window. Identifiers of additional other products listed within the set of structured data that are structurally similar to the first identifier and the second identifier may be determined based on metadata associated with the first identifier and based on metadata associated with the second identifier.

In another example embodiment a system including an interface configured to provide a rendering of structured data, the rendering including a plurality of items corresponding to a plurality of objects of the structured data is disclosed. A selection handler may be configured to receive input indicating selections of two or more items from the plurality of items. An object locator may be configured to determine two or more selected objects from the plurality of objects corresponding to the selected two or more items. A data parser may be configured to parse the structured data to determine metadata associated with each of the selected objects within the structured data. A path assembler may be configured to determine a selection path based on a comparison of the metadata associated with each of the selected objects, the selection path including similarities amongst the metadata and at least one variant. Selection logic may be configured to determine one or more additional objects of the structured data associated with the selected objects based on the selection path. A delivery engine may be configured to provide one or more additional items associated with the selected items, wherein the one or more additional items correspond to the one or more additional objects of the structured data.

The details of one or more implementations are set forth in the accompanying drawings and the description below. Other features will be apparent from the description and drawings, and from the claims.

BRIEF DESCRIPTION OF THE DRAWINGS

FIG. 1 is a block diagram of an example system configured to determine, based on a structure of a document, related, associated or otherwise similarly structured objects in the document.

FIG. 2B is an example embodiment of structured data upon which the display of the document in FIG. 2A is based.

FIG. 5A is an example screen shot of a document with a number of items displayed in a first window and a second window for receiving a user's selection of a subset of the items.

FIG. 5B is an example screen shot of a document with a number of items displayed in a first window along with a second window for displaying items that have been automatically selected in response to the user's selection of the subset of items from FIG. 5A.

FIG. 5C is an example screen shot of a document with a number of items displayed in a first window along with a second window for displaying items that have been automatically selected in response to a user's selection of the subset of items from FIG. 5B and a third window for modifying portions of the automatically selected items.

FIG. 6 is an example screen shot of a document with a number of items displayed in a first window and a second window for receiving a user's selection of a subset of the items.

DETAILED DESCRIPTION

Figure 2A:
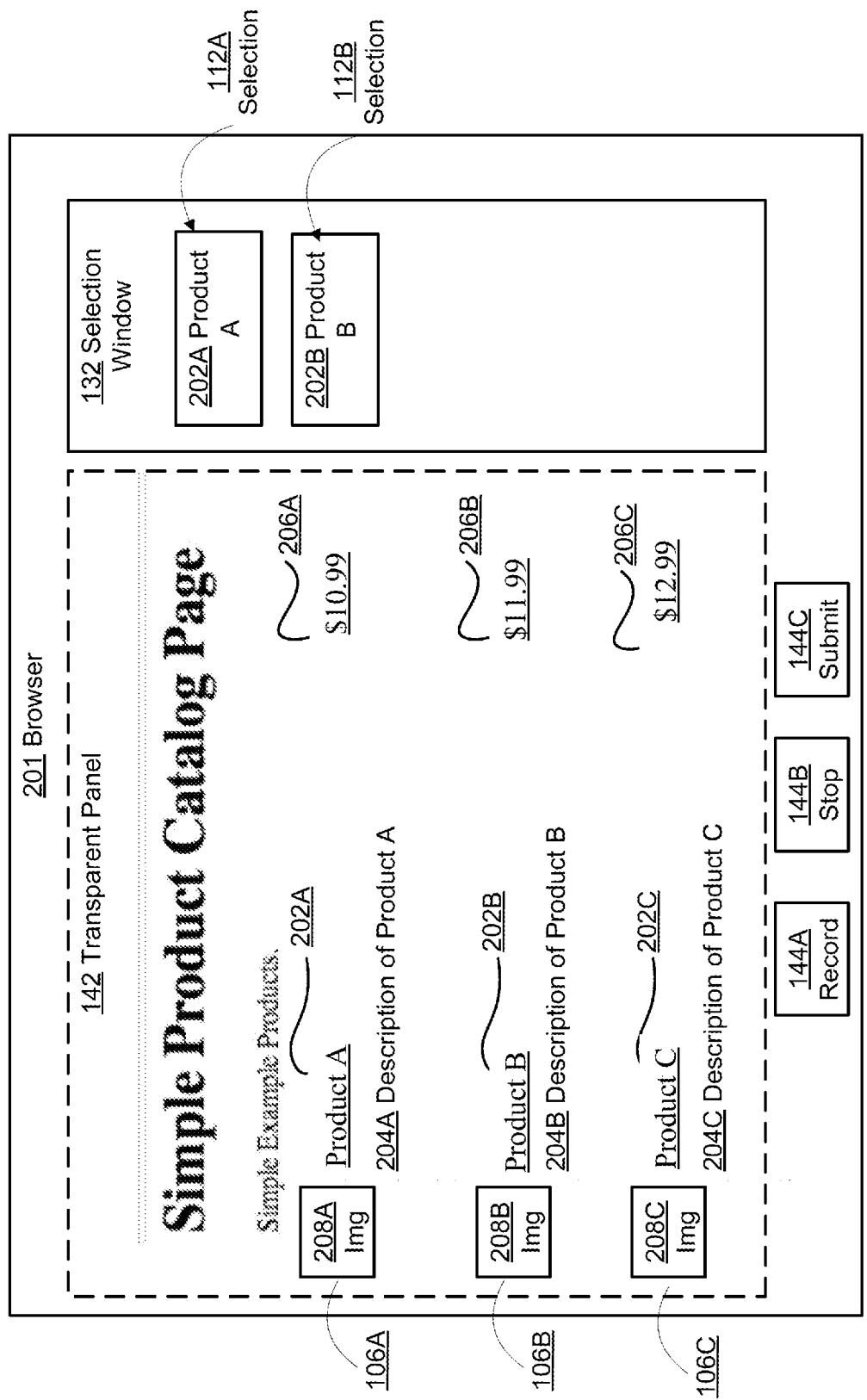
FIG. 2A is an example embodiment of a graphical interface to a document displayed by the system of FIG. 1.

As disclosed herein, a tool includes a graphical user interface (GUI) where a structured document is displayed, such that a user (e.g., campaign designer) may select and display two or more similar items from the document. The tool will then detect and extract all items from the structured document that are similar to the selected items. The tool may be web-based, and viewable in a browser.

FIG. 1 is a block diagram of an example system 100 configured to determine, based on a structure of a document, related, associated or otherwise similarly structured objects in the document. For example, an object crawler 110 may receive selections 112A, 112B within the interface 108, each selection 112A, 112B corresponding to an object 104A-F of structured data 102. Then for example, the object crawler 110 may determine and return, via the interface 108, any other objects 104A-F from the structured data 102 that are structurally similar to the selected objects.

The structured data 102 may include data, code and/or other, at least partially, structured or patterned information. For example, the structured data 102 may include a document of hypertext markup language (HTML) code, whereby the HTML code includes tags that provide a structure to objects within the code upon which the display of the items is based. Other example embodiments of the structured data 102 may include any structured programming or software code, database structures (e.g., tables or lists), or other structured document, including but not limited to word processing, spreadsheet, Java and XML documents.

The objects 104A-F may include data or other information from the structured data 102. The objects 104A-F may include data that may not be part of the structure of the structured data 102, such as user provided data. For example, an HTML document (e.g., structured data 102) may include an <img src . . . > tag whereby a user identifies what image is to be displayed. Then for example, the image, as identified by the user may include an example object 104A. In other example embodiments, the objects 104 A-F may include text, numbers, strings, symbols, images, hyperlinks, pointers, addresses and/or other data or information from the structured data 102.

Upon execution of the structured data 102 a rendering 140 of the objects 104A-G may be displayed in a user interface 108. For example, a webpage (e.g., rendering 140) may be rendered in a web browser (e.g., interface 108) upon execution of the HTML code (e.g., structured data 102) underlying the webpage.

The rendering 140 may include items 106A-F corresponding to the objects 104A-F of the structured data 102 as rendered or represented in the interface 108. The items 106A-F may include images, text, symbols, icons and/or other items rendered in the interface 108. For example, the item 106A may include an image displayed within the rendering 140 as determined from the object 104A, and the item 106B may include text rendered from the object 104B.

A user may make one or more selections 112A, 112B of the items 106A-F from the interface 108. The selections 112A, 112B may include mouse clicks, rollovers, recorded selections, copy-paste and/or other indications which of the items 106A-F are to be selected. For example, a user may select the items 106A and 106C by clicking on the rendered images or text of the items 106A and 106C in the interface 108.

According to an example embodiment, the items 106A-F may include information about products offered for sale by a company. Then for example, the items 106A-F may include information such as a product name, a price, dimensions, colors, a SKU number, a style number, a manufacturer, an expiration date, and/or other informational components of the products being offered for sale as appearing in the rendering 140.

A user may then make a selection 112A, 112B directed to only a portion of the information provided about the products. For example, the selections 112A and 112B may be only of the prices of the products offered for sale. According to an example embodiment, a lowest level item of the items 106A-F that may be selected by a user may be determined based on the corresponding objects 104A-F and/or other data of the structured data 102 (including metadata 120A-G). For example, if a webpage 140 displays information about a number of different products offered for sale, the structured data 102 upon which the webpage is based may include a table element that lists all the products and corresponding informational elements about the products (e.g., a product name, a price, dimensions, colors, a SKU number, a style number, a manufacturer, an expiration date). Thus, the structured data 102 may be arranged hierarchically, such that the table element is at a higher level than the product elements, which, in turn, are at higher levels than the informational elements. Then, when a selection 112A, 112B is received a lowest level item can be associated with the selection. Metadata elements (e.g., 120A-G), such as, for example, tags, flags, etc., associated with the data objects 104A-F can be used to impose the hierarchical structure on the objects.

The selections 112A and 112B, in other example implementations, may correspond to or indicate higher level items 106A-F. A higher level item may include a grouping of one or more of the items 106A-F. For example, the selection 112A may indicate a product, which may include multiple lower level items 106A-F such as product name, manufacturer, price and dimension information, all of which may be indicated by the selection 112A.

After identifying data objects that correspond to the selections 112A and 112B, similarities between the identified data objects may be determined based on the structure of the data. For example, the object crawler 110 may receive the selections 112A and 112B of items 106A and 106C, respectively, displayed in the interface 108 and may determine, based on the selections 112A and 112B, which objects 104A-F of the structured data 102 correspond to the selections 112A and 112B.

The object crawler 110 may, for example, parse the structured data 102 to determine the objects 104A and 104C that correspond to the selections 112A and 112B, respectively. The object crawler 110 then may parse the remainder of the structured data 102 to determine which of the other objects (e.g., 104B, 104D-G) may be associated with the selected objects 104A and 104C. For example, the object crawler 110 may determine that object 104E is associated with the selected objects 104A and 104C, based on the existence of a similar structure amongst the objects 104A, 104C and 104E within the structured data 102. Such a similar structure may be determined based on tags (e.g., metadata 120A-G) associated with the objects 104A, 104C, and 104E within the structured data 102.

Within the object crawler 110 a selection handler 114 may receive the selections 112A and 112B. In one implementation, the selections 112A, 112B may indicate coordinates selected by a user within a window (e.g., rendering 140) of the interface 108. The selection handler 114, in collaboration with the interface 108 and/or the structured data 102 may then determine or map which items 106A-F of the interface 108 correspond to the coordinates indicated by the selections 112A and 112B. In another example embodiment, the selection handler 114 may receive, from the interface 108, the items 106A, 106C corresponding to the selections 112A, 112B.

An object locator 116 may determine which objects 104A-F of the structured data 102 correspond to the selections 112A, 112B. For example, the object locator 116 may determine that the objects 104A and 104C of the structured data 102 correspond to the selected items 106A and 106C as indicated by the selections 112A and 112B. In one implementation, the object locator 116 may determine which data objects 104A-F correspond to which items 106A-F based on matching numbers, letters, symbols, characters, images or other characters. For example, the selected item 106C may include a rendering of the text 'Gadget' in the interface 108. Then, for example, the object locator 116 may search the structured data 102 to determine which of the objects 104A-F include the text 'Gadget' as corresponding to the selected item 106C. In another example embodiment, the object locator 116 may determine the correspondence between the selected items 106A and 106C and the objects 104A-F of the structured data 102 based upon an execution of the structured data 102, whereby, as discussed above, the objects 104A-F are rendered on the interface 108 as the items 106A-F during an execution of the structured data 102.

A data parser 118 may parse the structured data 102 to determine which metadata 120A-G may be associated with the selected objects 104A-F. For example, the data parser 118 may determine that the metadata 120A and the metadata 120B both are associated with the object 104A. Thus, the combination or sequence of metadata 120A and 120B may provide a path to the selected object 104A. Then, for example, the sequence of metadata 120A and 120D may provide a path to the selected object 104C.

The metadata 120A-G may provide a structure for the structured data 102. The metadata 120A-G may include tags, identifiers, grammar, data and/or other structures used in the structured data 102. For example, the metadata 120A-G may include standard tags used in HTML code, and the objects 104A-F may include user specific values for the tags. For example, as referenced above, the metadata 120E may include an HTML tag indicating that an image is to be displayed in browser, whereby the object 104D may indicate which image is to be displayed. While the structured data 102 may be written or exist as a cohesive set of code or data, the metadata 120A-G may include a subset of the structured data 102.

FIG. 2B includes an example embodiment of the structured data 102 as HTML code 102 and including metadata 120. For example, metadata 120 from the HTML code 102 may include the HTML opening tags <html>, <body>, <h1>, <tr . . . >, <td> and <p> and corresponding HTML closing tags </html>, </body>, </h1>, </tr . . . >, </td> and </p>. In the HTML code 102, example objects (e.g., 104A-F) may include Simple Example Products, productA.png, Product A, Description of Product A and $10.99.

Referring again to FIG. 1, according to an example embodiment, a constructor 148 may generate a tree representation 150 of the structured data 102. The tree representation 150 may include a representation of the structured data 102 that more clearly displays its hierarchical and/or structured nature. For example, FIG. 2C includes an example tree representation 150 of the HTML code 102 of FIG. 2B. The tree representation 150 may allow for quick determination as to the ancestry of the nodes and the sequences or paths associated with the selections 112A and 112B. For example, from the tree representation 150 of FIG. 2C, it may be seen that the nodes of meta data objects, tr1, tr2 and tr3, each are associated with or descend from common ancestor nodes (of meta data objects) "html", "body" and "table". Furthermore, the path to the selection 112A may include the nodes of meta data objects, "table", "tr1", "td2", and "a" (in addition to the "html" and "body" nodes). Turning back now to FIG. 1, the constructor 148 may organize or arrange the structured data 102 into the tree representation 150, whereby the metadata 120A-G and the objects 104A-F of the structured data 102 may be organized as nodes within the tree representation 150.

In an example embodiment, the object crawler 110 may use an XML Path Language (XPath) to select the nodes from the tree representation 150 of the structured data 102.

As discussed above, to identify hierarchical relationships between related data objects one or more paths or sequences of the metadata 120A-G associated with each object 104A-F may be identified. For example, a first path from a common ancestor node to selected object 104A may include the metadata 120A and the metadata 120B, and a second path from a common ancestor node to the selected object 104C may include the metadata 120A and the metadata 120D. A path assembler 122 may determine a selection path 124 associated with the selected objects 104A and 104C based on their respective metadata paths. For example, the path assembler 122 may compare or otherwise combine the first path and the second path to determine the selection path 124 for any additional objects 104A-F associated with the selections 112A and 112B.

The selection path 124 may include a sequence, integration or other combination of the metadata 120A-G from the structured data 102 associated with the selections 112A, 112B. For example, the selection path 124 may include an integration of the first path of metadata objects 120A and 120B associated with the selected object 104A and the second path of metadata objects 120A and 120D associated with the selected object 104C resulting in a sequence of the metadata objects 120A that are common to both paths and a variant 126 that is not common to both paths.

The variant 126 may indicate a variance between the metadata associated with the first path to the first selected object (e.g., 104A) and the second path to the second selected object (e.g., 104C). For example, as discussed above, the first path to the object 104A may be associated with the metadata 120A and metadata 120B, and the second path to the second object 104C may be associated with the metadata 120A and the metadata 120D, where the metadata 120B and 120D are different relative to the metadata 120A. Then for example, the variant 126 may indicate that between the paths (e.g., first path and second path) the metadata 120B and the metadata 120D are different. The path assembler 122 may then determine that the selection path 124 must include metadata 120A followed by variant 126, where the variant 126 may include any metadata 120A-G following metadata 120A in the structured data 102.

Selection logic 128 may determine additional data from the structured data 102 that corresponds to the selections 112A and 112B. The selection logic 128 may compare the selection path 124 to the remaining (e.g., unselected) objects of the structured data 102 to determine any additional objects (e.g., 104E) that may correspond to the selections 112A and 112B. For example, as just discussed, the selection path 124 may include a sequence of the metadata objects that include metadata objects that are common to a first and second path (e.g., 120A) and a variant object 126. The selection logic 128 may then compare the selection path 124 to the tree representation 150 of the structured data 102 and determine that only the object 104E conforms to the selection path 124 because the path to the object 104E includes the common metadata 120A and a metadata variant 120F. The object 104D may not be included because although its path includes the metadata 120A and the variant 126, it also includes extra metadata 120E, which does not conform to the selection path 124.

A delivery engine 130 may be configured to provide the one or more additional objects selected from the structured data 102 that correspond to the selections 112A and 112B. For example, as just discussed, the selection logic 128 may determine which of the other objects (e.g., 104B, 104D, 104E, 104F) are structurally similar to the selected objects 104A and 104C based on the selection path 124. The delivery engine 130 may then, for example, provide, via the interface 108, a selection of the items (e.g., 106E) corresponding to the other objects structurally similar to the selections 112A and 112B.

A selection window 132 may include a window, pop-up, panel or other portion of the interface 108 displaying the selections 112A, 112B. For example, the selection window 132 may include a panel of the interface 108 displaying the selected items 106A and 106C that correspond to the selections 112A and 112B. Then, for example, when the delivery engine 130 provides the additional item(s) corresponding to the selected items, it may provide the additional item 104E within the selection window 132.

It may be that after the selections (e.g., 106A, 106C, 106E) are displayed in the selection window 132, a user decides to modify the selections 112A, 112B. The user may then, for example, make additional selections, remove existing elections and/or modify existing selections of the items 106A-F of the interface 108. Then for example, the object crawler 110 may modify the selected items appearing in the selection window 132 based on a new or modified set of items that correspond to the modified user selections.

A user may provide one or more instructions 134 to the object crawler 110 to clean up the selections from the selection window 132. The instruction 134 may include any formatting, addition, deletion, editing, filtering, sorting or other processing command that may be performed on any of the selected items (e.g., 106A, 106C and 106E). For example, the returned selections (appearing in the selection window 132) may include prices of products from a webpage. Then, for example, the instructions 134 may include rounding the price up to the nearest whole dollar amount, removing the decimal point and any trailing numbers and adding a "$" before each price. Applied to a value of "112.79" that may appear in the selection window 132, the instructions 134 may result in the modified or cleaned up value "$113". The instruction 134 may include modifying the items or selections of the selection window 132 based on any user-defined regular expression.

A clean up engine 136 may receive, execute, or otherwise apply the instruction 134 with regards to any of the selections of the selection window 132. The clean up engine 136 may, for example, parse the text of the selected items 106A, 106C and 106E to apply the instruction(s) 134. Then, for example, the clean up engine 136 may return the modified items to the selection window 132 or to another location.

According to an example embodiment, a user may review items 106A, 106C and 106E in the selection window 132, pre and/or post clean up by the clean up engine 136, and confirm or reject the items via a confirmation 138. The confirmation 138 may include a button or other selectable portion of the interface 108 that may be used to determine which of the items of the selection window 132 are confirmed and/or rejected. Then, for example, based on the confirmation 138, the object crawler 110 may retrieve the confirmed or accepted items from the selection window 132 for copying and/or pasting to another tool, application or other location.

According to an example embodiment of the rendering 140, the structured data 102 may appear in the interface 108. The rendering 140 may include a window, pop-up or other panel of a rendering or representation of the structured data 102 including portions thereof. For example, as discussed above, the structured data 102 may include HTML code, and the rendering 140 may include a web or other Internet page displaying at least portions of the HTML code (e.g., 102) on the interface 108.

A transparent panel 142 may be displayed or rendered atop of the rendering 140. The transparent panel 142 may include an invisible panel placed on the rendering 140. When a user makes the selections 112A, 112B of items 106A-F from the rendering 140 of the interface 108, the transparent panel 142 may capture the selection(s). As discussed above, the selections 112A, 112B may include coordinates of the rendering 140 where the selections 112A, 112B were made. Then, for example, the transparent panel 142 may capture the coordinates of the rendering 140 where the selections 112A, 112B were made and determine to which of the items 106A-F the selections 112A, 112B correspond (based on a document object model of the structured data 102). Thus a user's mouse click to select an item (e.g., 106A-F) displayed in the rendering 140 can be swallowed by the transparent panel 142, so that if the user clicks on a hyperlink in the rendering 140 the hyperlink is not loaded in response to the click.

The transparent panel 142 may highlight or otherwise indicate which selections 112A, 112B have been made via the interface 108. For example, upon receiving the selections 112A, 112B, the transparent panel 142 may render highlighted boxes around the selected items 106A and 106C to indicate to the user which items have been selected. The transparent panel 142 may allow the appearance of the rendering 140 of the structured data 102 to be modified in the interface 108 without actual modification to the underlying structured data 102.

A user may use a selection tool 144 to make the selections 112A, 112B via the interface 108. For example, the selection tool 144 may include a record, pause, stop and/or submit button for the selections 112A and 112B. A user may then, for example, using a mouse to interact with the interface 108, click the record button, make the selections 112A and 112B, which may be captured by the transparent panel 142. Then, for example, the user may select the stop and submit buttons to send or otherwise provide the selections 112A and 112B to the object crawler 110, which processes the selections 112A and 112B as discussed above.

The interface 108 may be used to display multiple pages 146, of an online resource. For example, the interface 108 may display the search results for an Internet search based on some search terms. The search may yield a large number of results, all of which cannot be displayed in a single page or rendering 140 of the interface 108. Then, for example, multiple pages 146 of search results may be provided, each page including at least a portion of the search results. If the interface 108 does include multiple page 146, then a user may make selections 112A, 112B across any number of the pages 146 and/or the object crawler 110 may process the selections 112A, 112B and return similarly structured items across any number of the pages 146. For example, the selection 112A may be of an item on the first page 146 of the interface 108, and the second selection 112B may be of an item on the fifth page 146, and the results as determined by the object crawler 110 may span across any of ten result pages 146.

According to a specific embodiment, the selected items 106 A, 106C and 106E, as confirmed (e.g., via confirmation 138) from the selection window 132 may be provided to a keyword generator 152. The keyword generator 152 may, based on the selected items, determine one or more keywords 154. The keywords 154 may include portions of the selections to be used in a search and/or other application. For example, search engine advertising may request that an advertiser or retailer provide keywords (e.g., 154) for which the retailer wants advertising displayed. Then when a user enters one or more of the keywords 154 into the search engine (e.g., as search terms), the search engine may display the retailer's advertisement which may include a "sponsored link" to the advertiser's website. Thus, the keyword generator 152 may parse the selections from the selection window 132 to determine potential keywords 154.

A keyword 154 may include any word, image or other symbol that may be the subject of an internet search. For example, the items 106A-F may include various models of car radios from a variety of manufacturers. Then for example, the keywords 154 associated with the items may include "car", "radio", "car radio", the model numbers, the product names and the manufacturer names.

The keyword generator 152 may be used by if a retailer that, as discussed above, offers a large and/or diverse number of products for sale and wants to develop an advertising campaign based on at least a subset of those products. Then for example, the retailer or advertising campaign manager, may make the selections 112A, 112B on the interface 108 of several example products that are targets of the advertising campaign. The object crawler 110 then may crawl through the remainder of the products from the rendering 140, including any additional pages 146, and return similar items to the selection window 132. The user may then clean-up the selections from the selection window 132 and determine which keywords 154 to use in the advertising campaign.

FIG. 2A is an example embodiment of a graphical interface (e.g., a browser 201 to a document displayed by the system of FIG. 1. The graphical interface may include a browser 201 configured to render or execute HTML and/or other structured data (e.g., 102). The browser 201 includes an example rendering of a simple catalog page for a retailer. The catalog page includes three items 106A, 106B and 106C that may be selected by a user using the record 144A, stop 144B and submit 144C buttons. For example, after activating the record button 1144A, a user may make the selections 112A and 112B, hit the stop button 144B and then the submit button 144C. After receiving a selection of the submit button 144C, the selections 112A and 112B may be submitted or otherwise provided to the object crawler (e.g., 110).

The items 106A-C as rendered in the browser 201 may further include informational identifiers 202A-C, 204A-C, 206A-C and 208A-C. The identifiers 202A, 204A, 206A and 208A may all include information pertaining to the product or item 106A, and may be individually selectable (as selections 112A, 112B). The identifiers 202A-C may include a title, the identifiers 204A-C may include a description, the identifiers 206A-C may include a price, and the identifiers 208A-C may include an image. As referenced above, in an example hierarchical structure of the underlying structured data 102, the identifiers 202A-C, 204A-C, 206A-C and 208A-C may be subsets of the products 106A-C, respectively. In the example of FIG. 2A, a user may have made selections 112A, 112B of only the title identifiers 202A and 202B.

FIG. 2B is an example embodiment of structured data upon which the display of the document in FIG. 2A is based. The HTML code 102 may include the identifiers 202A-C, 204A-C, 206A-C and 208A-C corresponding to the browser 201 of FIG. 2A, wherein the identifiers 202A, 204A, 206A and 208A are marked for exemplary purposes. As discussed above, the HTML code 102 may also include metadata 120 that can provide a hierarchical structure to the identifiers where much of the metadata 120 is delineated within brackets < >. It may be noted however, that with regards to the identifier 208A that both metadata 120 and the identifier 208A resides between the brackets < >.

Figure 2C:
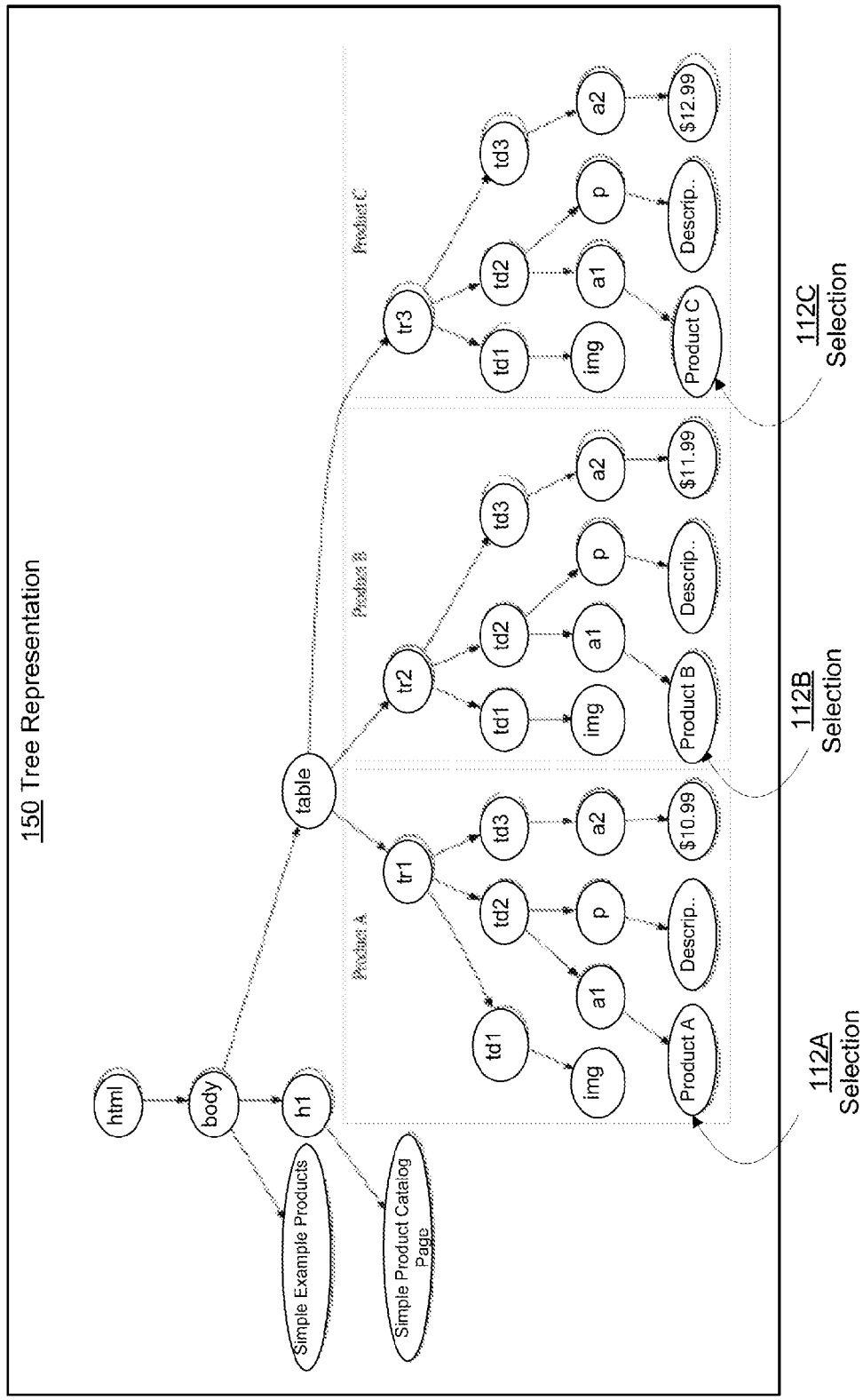
FIG. 2C is an example embodiment of a tree representation of the structured data of FIG. 2B.

FIG. 2C is an example embodiment of a tree representation 150 of the structured data of FIG. 2B. In the tree representation 150, the metadata 120 of FIG. 2B and corresponding identifiers 202A-C, 204A-C, 206A-C and 208A-C appear as nodes of the tree. The selections 112A and 112B from FIG. 2A are indicated on the tree representation 150.

For the selection 112A, which corresponds to the selection 112A of FIG. 2A, the path assembler 122 may determine a first path via the metadata nodes, which may include: html→body→table→tr1→td2→a1. The path assembler 122 may then determine a second path for the selection 112B which may include: html body→table→tr2→td2→a1. To determine the selection path 124 and variant 126 associated with the selections 112A and 112B, the path assembler 122 may compare the first and second path.

The comparison of the first and second paths may result in a selection path beginning with the lowest common ancestor between the selections 112A, 112B, which may be the "table" node, as the other higher common ancestor nodes may include the "html" and "body" nodes. Then for example, the path assembler 122 may determine the similarities and variances amongst the paths, the variances including tr1 and tr2, and the similarities including td2→a1. This may result in a selection path 124 for the selections 112A and 112B of table→trX→td2→a1, with 'trX' being the variant 126. The selection logic 128 may then determine if any other nodes of the tree representation 150 correspond to the selection path 124 and include the variant 126. In the example of FIG. 2C, it may be determined that selection 112C corresponds to the selection path 124 and includes the variant 126 'trX'. As discussed above, the selection 112C (e.g., "Product C") may then be passed to the delivery engine 130 and back to the interface 108.

Figure 2D:
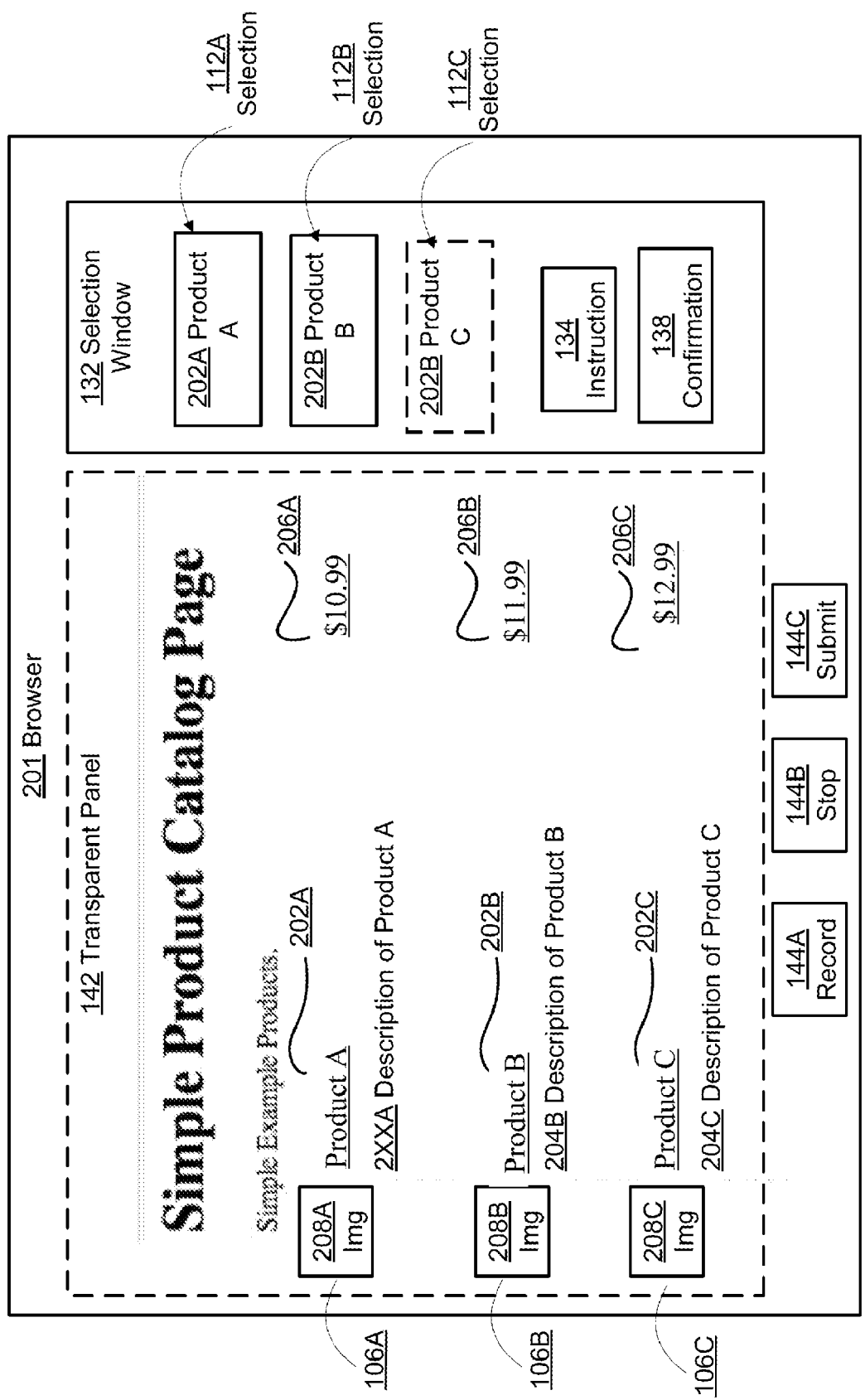
FIG. 2D is an example embodiment of a graphical interface to the document shown in FIG. 2A, along with items that have been automatically selected in response to a user's selection of two similar items.

FIG. 2D is an example embodiment of a graphical interface (e.g., a browser 201) for the document shown in FIG. 2A, along with items that have been automatically selected in response to a user's selection of two similar items. The selection window 132 may include the original user selections 112A and 112B and the additional selection 112C associated with the original selections as determined by the object crawler 110 and discussed above with regards to FIG. 2C. A user may then provide instructions 134 to clean up the selections from the selection window 132.

Figure 2E:
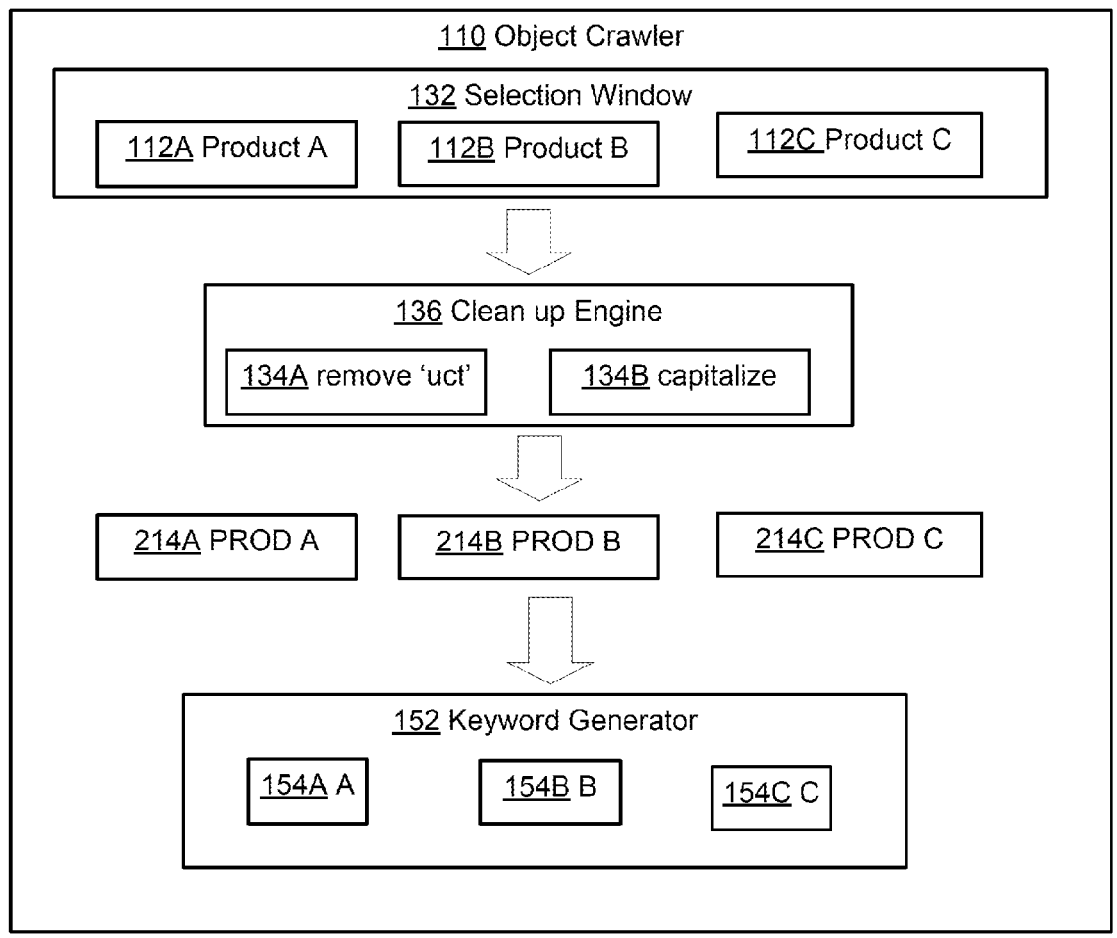
FIG. 2E is an example embodiment of the object crawler of FIG. 1 as associated with FIG. 2D.

FIG. 2E is an example embodiment of the object crawler 110 of FIG. 1 as associated with FIG. 2D. The clean up engine 136 may receive from the user instructions 134A and 134B and may apply the instructions 134A and 134B to the selections 112A-C from the selection window 132. The instruction 134A may provide that 'uct' should be removed from the selections 112A-C and the instruction 134B may provide that the selections 112A-C be capitalized. The application of the instructions 134A and 134B by the clean up engine 136, may result in the intermediate items 214A-C. The intermediate items 214A-C may include the selections from the selection window 132 after processing by the clean up engine 136. According to an example embodiment, the intermediate items 214A-C may be returned to the selection window 132 post clean up processing.

The keyword generator 152 may then determine or generate the keywords 154A-C based on the intermediate items 214A-C. For example, the keyword generator 152 may determine that only 'A', 'B', and 'C' should be used as keywords 154A-C.

Figure 3:
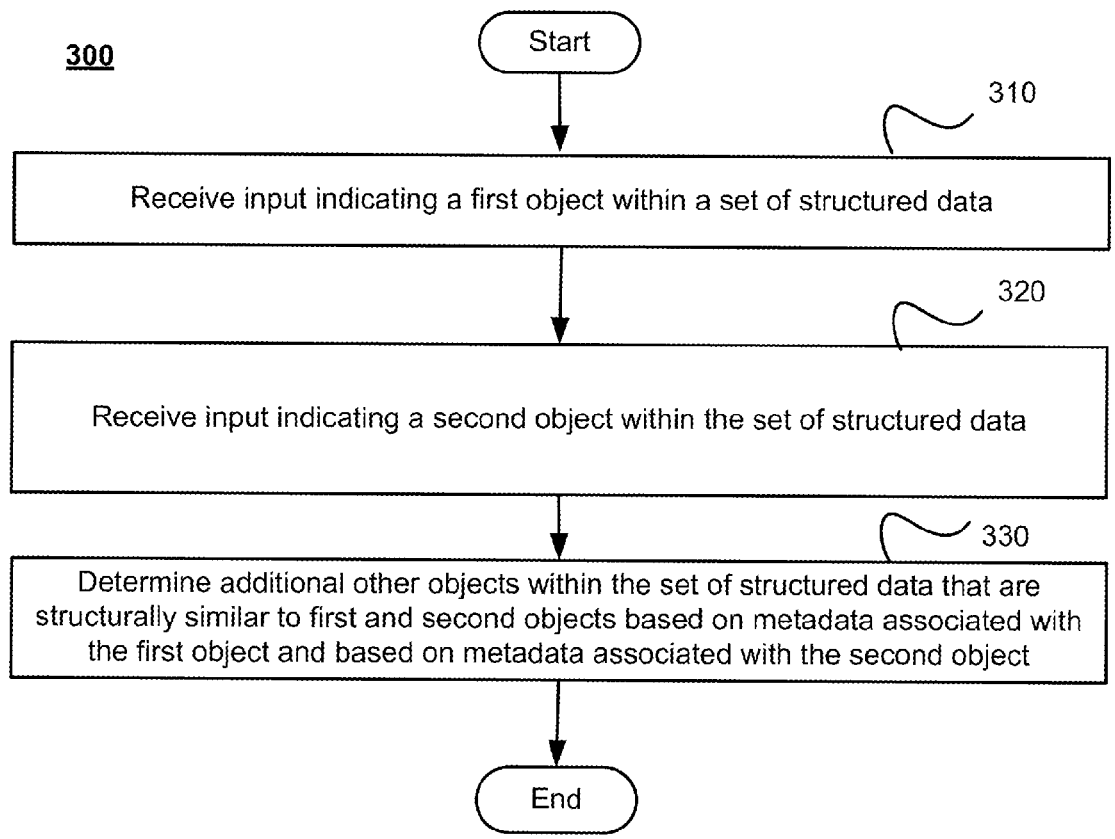
FIG. 3 is flowchart illustrating example operations of the system of FIG. 1.

FIG. 3 is flowchart 300 illustrating example operations of the system of FIG. 1, according to an example embodiment. More specifically FIG. 3 illustrates operational flow 300 representing example operations related to determining additional selections.

After a start operation, input indicating a first object within a set of structured data may be received (310). For example, in FIG. 1, the selection handler 114 may receive the selection 112A indicating the object 104A within the structured data 102.

Input indicating a second object within a set of structured data may be received (320). For example, the selection handler 114 may receive the selection 112B indicating the object 104C from the structured data 102.

Additional other objects within the set of structured data that are structured similar to the first and second object based on metadata may be determined (330). The additional other objects that are structured similarly to the first and second selected objects 104A and 104C based on the metadata 120A-G. For example, the object crawler 110 may determine that the object 104E is structurally similar to the objects 104A and 104C based on the metadata 120A-G.

Figure 4:
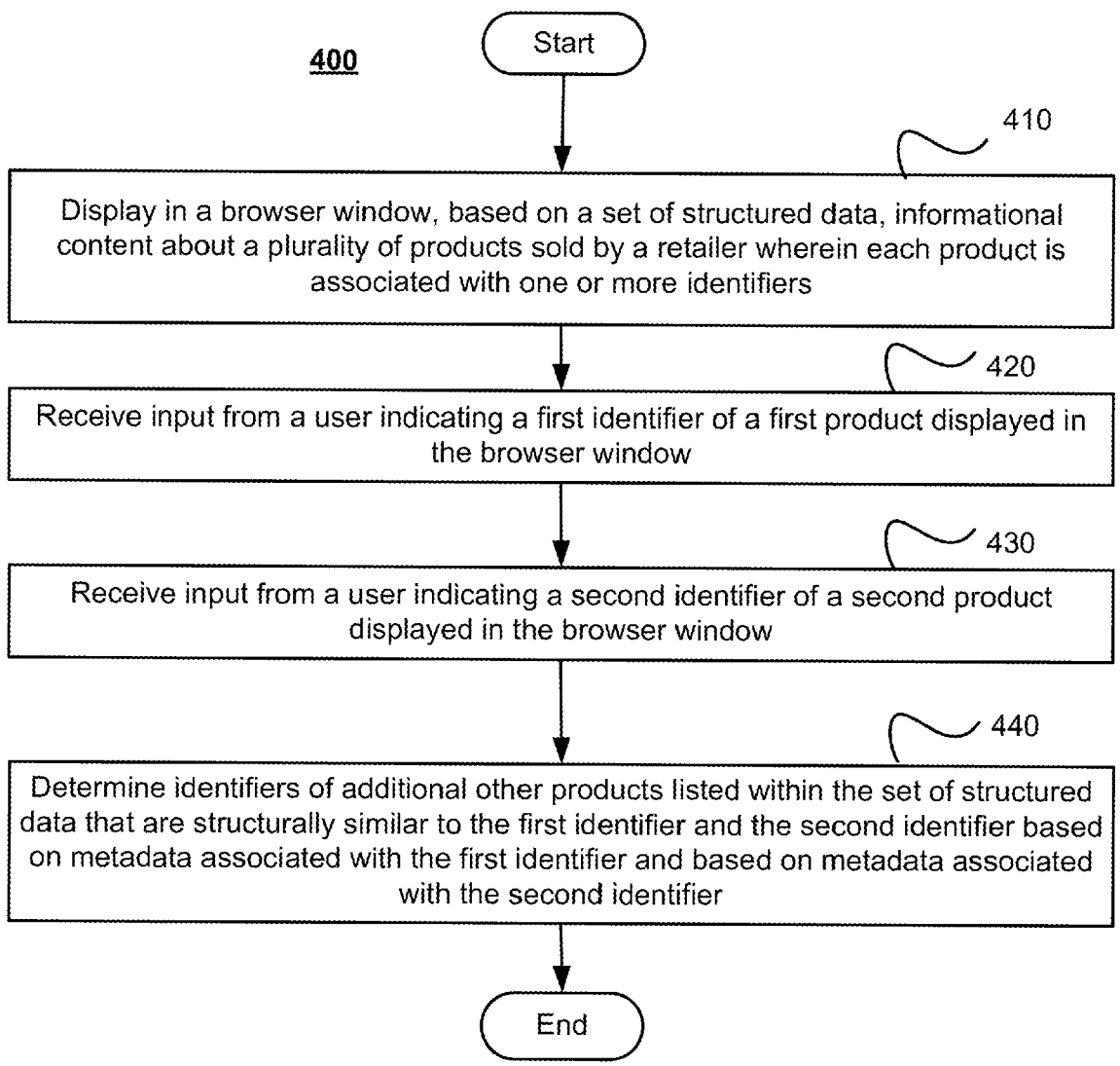
FIG. 4 is flowchart illustrating example operations of the system of FIG. 1.

FIG. 4 is a flowchart 400 illustrating example operations of the system of FIG. 1. More specifically, FIG. 4 illustrates example flow 400 representing example operations related to determining keywords for an online advertising campaign for a retailer.

After a start operation, informational content about a plurality of products sold by a retailer, wherein each product is associated with one or more identifiers may be displayed in a browser window based on a set of structured data (410). For example, in FIG. 1, the interface 108 may display the rendering 140 of the items 106A-F based on the structured data 102. The items 106A-F may include for example, products sold by a retailer wherein each product is associated with one or more identifiers (e.g., 202A-C, 204A-C, 206A-C, 208A-C). In FIG. 2A, the product or item 106A may be associated with the identifiers 202A, 204A, 206A and 208A.

Input from the user indicating a first identifier of the first product as displayed in the browser window may be received (420). For example, in FIG. 2A, input may be received indicating the identifier 202A of Product A as displayed in the browser selection window 132 of the browser 201.

Input from the user indicating a second identifier of a second product displayed in the browser window may be received (430). For example, in FIG. 2A, input may be received indicating the identifier 202B of Product B as displayed in the browser selection window 132 of the browser 201.

Identifiers of additional other products listed within the set of structured data that are structurally similar to the first identifier and the second identifier may be determined based on metadata associated with the first identifier and based on metadata associated with second identifier (440). For example, in FIG. 2C, the object crawler 110 may determine, based on the metadata nodes, that additional selection 112C is structurally similar to the selections 112A and 112B and corresponding identifiers 202A and 202B, respectively.

Figure 5A:
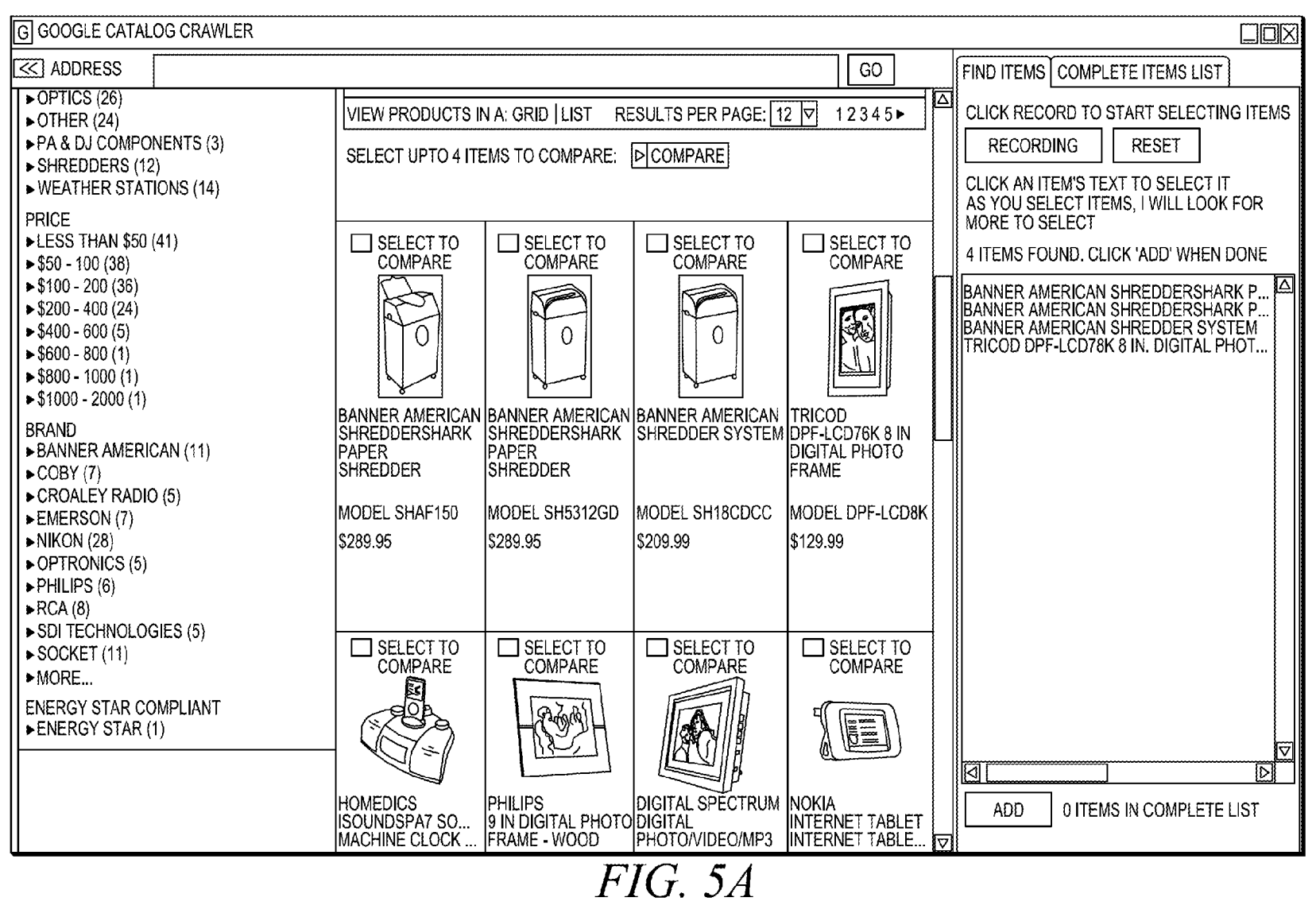

FIG. 5A is an example screen shot of a document with a number of items displayed in a first window and a second window for receiving a user's selection of a subset of the items. The interface 201 (e.g., browser) may include a rendering 140 of multiple items 106 across multiple pages 146, whereby each item may include various identifiers 202-208. The right side of the browser 201 may include a selection window 132 with several identified user selections 112.

Figure 5B:
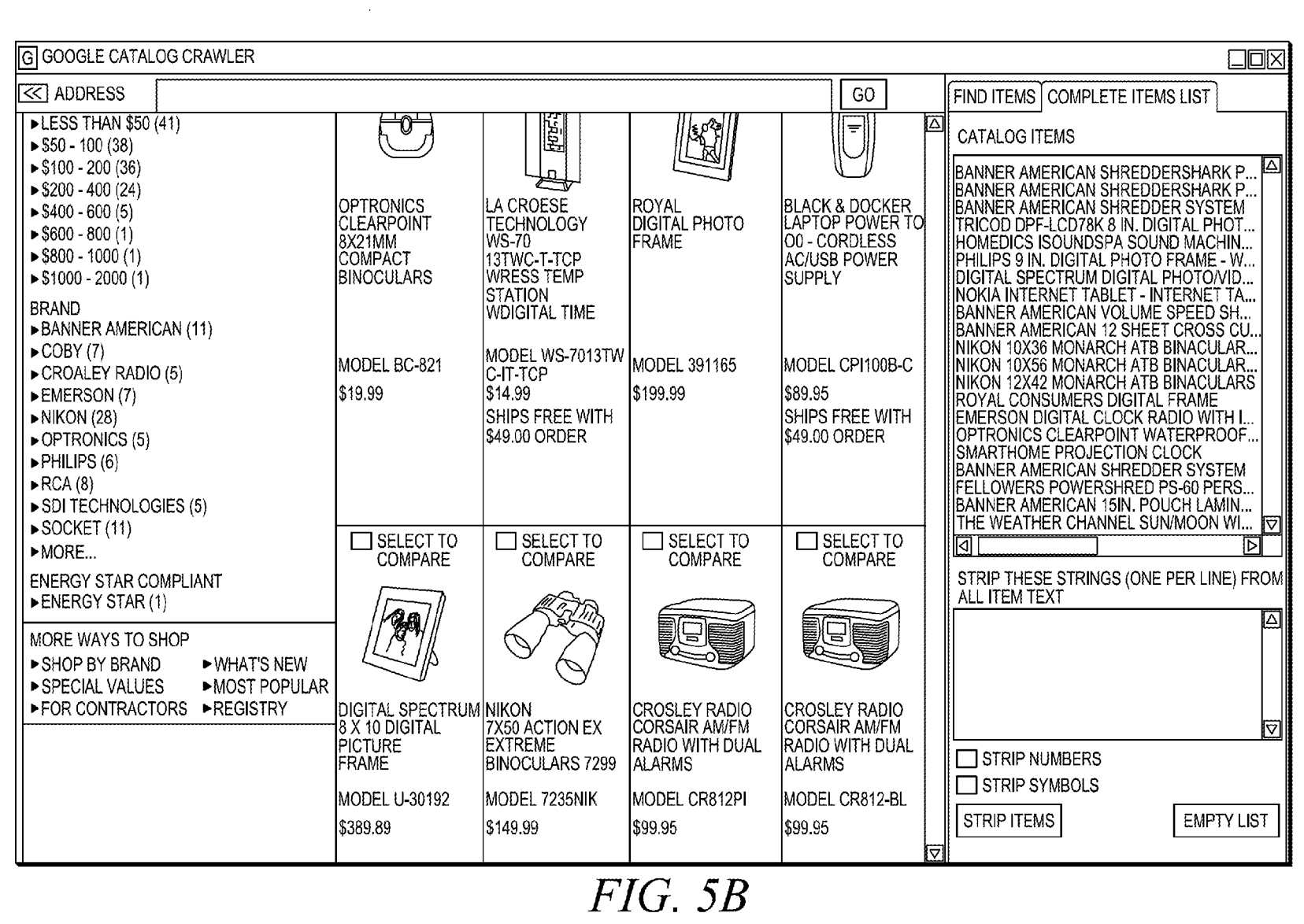

FIG. 5B is an example screen shot of a document with a number of items displayed in a first window along with a second window for displaying items that have been automatically selected in response to the user's selection of the subset of items from FIG. 5A. In FIG. 5B, it may be observed that the object crawler 110 has included multiple additional selections 112 anticipated to be associated with, or structurally similar to, the original user selections 112 of FIG. 5A.

Figure 5C:
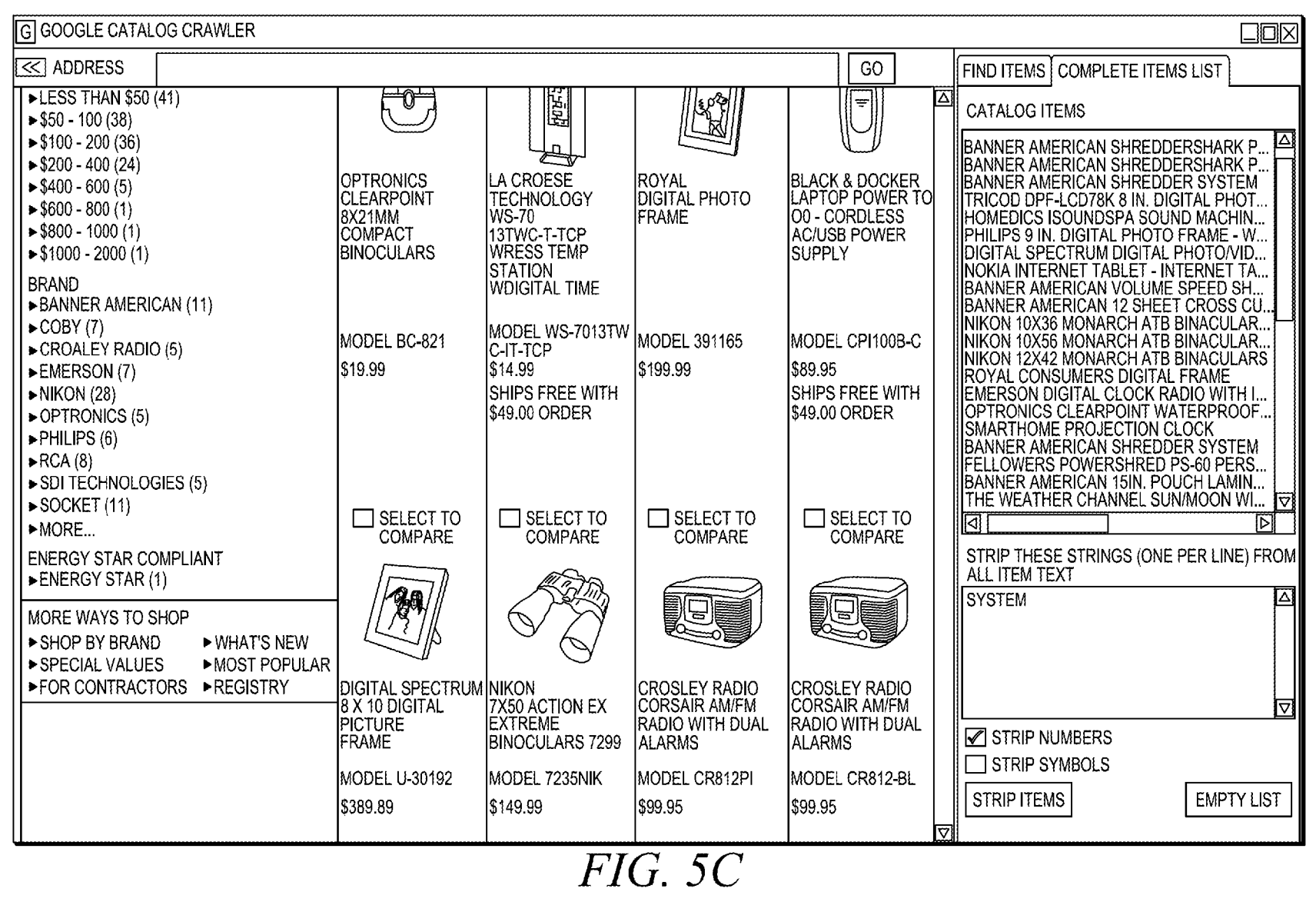

FIG. 5C is an example screen shot of a document with a number of items displayed in a first window along with a second window for displaying items that have been automatically selected in response to a user's selection of the subset of items from FIG. 5B and a third window for modifying portions of the automatically selected items. In FIG. 5C, it may be observed that a user has entered two instructions 134A and 134B to be performed on the selections 112. The instructions 134A and 134B may include stripping from the selections 112, the text 'SYSTEM' and any numbers that appear.

Figure 6:
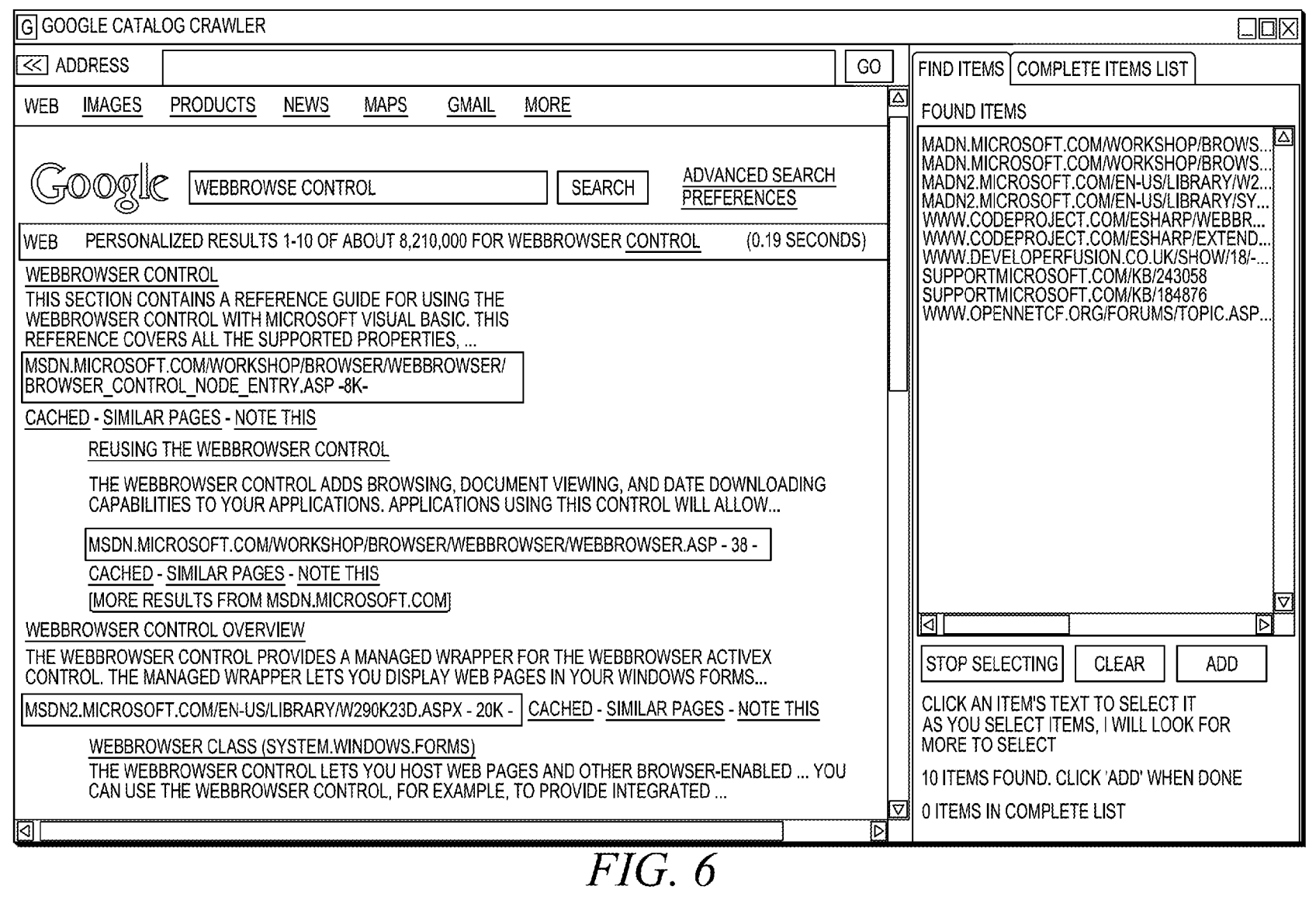

FIG. 6 is an example screen shot of a document with a number of items displayed in a first window and a second window for receiving a user's selection of a subset of the items. The interface 201 (e.g., browser) may include a rendering 140 of multiple items. However rather than being a product selection page from a retailer, the interface 201 may display a rendering of a search result for 'webbrowse control'. The right side of the interface 201 may include a selection window 132 with several identified user selections 112.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD)

monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented method of automatically selecting items displayed within in a graphical user interface comprising a first window and a second window, the first window displaying a plurality of items including a first item and a second item, the method comprising:
   rendering a transparent panel over the first window, wherein the transparent panel is invisible to the user and configured to capture input indicating selections of the first item and the second item displayed under the transparent panel so that hyperlinks associated with the first item and the second item in the first window are not invoked when selected through the transparent panel;
   receiving input indicating a user's selection of the first item, wherein the first item corresponds to a first object in a set of structured data;
   receiving input indicating the user's selection of the second item, wherein the second item corresponds to a second object in the set of structured data;
   determining automatically, with a processor of a computer system, additional other objects within the set of structured data, wherein the additional other objects are structurally similar to first and second objects, wherein the additional other objects correspond to additional other automatically selected items in the plurality of items displayed within the graphical user interface; and
   indicating in the second window the selection of the first, the second, and the additional other selected items.

2. The computer-implemented method of claim 1,
   wherein the plurality of items are rendered the first window from the set of structured data and
   wherein the second item is rendered in the first window based on the second object in the set of structured data.

3. The computer-implemented method of claim 2 further comprising:
   determining first coordinates of a pointer in the first window when the selection of the first item is received;
   mapping the first coordinates to the first object;
   determining second coordinates of the pointer in the first window when the selection of the second item is received;
   mapping the second coordinates to the second object; and
   identifying the first and second objects based on the mappings.

4. The computer-implemented method of claim 1, wherein the first object, the second object, and the additional other objects include information associated with an identical metadata category.

5. The computer-implemented method of claim 1, further comprising:
   displaying the first item, the second item, and the additional other item in the second window of the graphical user interface, the second window being different from the first window.

6. The computer-implemented method of claim 5, wherein the first item is displayed within a first page of the first window, and wherein the second item is displayed within a second page of the first window.

7. The computer-implemented method of claim 5, further comprising:
   receiving an instruction to display a modified version of at least one of the first selected item, the second selected item, and the additional other selected items; and
   displaying a modified version of at least one of the first selected item, the second selected item, and the additional other selected items in the second window in response to receipt of the instruction.

8. The computer-implemented method of claim 1, further comprising:
   wherein determining the additional other objects within the set of structured data includes:
      identifying, within a hierarchical relationship between objects of the structured data, a lowest common ancestor node of the first and second objects;
      identifying a first path through nodes of the hierarchical relationship from the lowest common ancestor node to the first object;
      identifying a second path through nodes of the hierarchical relationship from the lowest common ancestor node to the second object;
      identifying one or more identical nodes in the first path and the second path;
      identifying a variant in the first path and the second path; and
      identifying the additional other objects related to the lowest common ancestor via other paths that include the one or more identical nodes and the variant at the same position in the other paths at which the variant between the first and second paths occurs.

9. The method of claim 1, wherein the structured data includes markup language code and wherein the first and second objects are identified within the markup language code by one or more markup tags.

10. A computer-implemented method comprising:
    displaying in a browser window, based on a set of structured data, informational content about a plurality of products sold by a retailer wherein each product is associated with one or more identifiers, the browser window displaying a plurality of items including a first product and a second product;
    rendering a transparent panel over a portion of the browser window, wherein the transparent panel is invisible to a user and configured to capture input indicating selections of the first product and the second product displayed under the transparent panel so that hyperlinks associated with the first product and the second product in the portion of the browser window are not invoked when selected through the transparent panel;

receiving input from the user indicating the user's selection of a first identifier of the first product displayed in the browser window;

receiving input from the user indicating the user's selection of a second identifier of the second product displayed in the browser window; and determining automatically, with a processor of a computer system, additional identifiers of additional other products listed within the set of structured data, where the additional identifiers are structurally similar to the first identifier and the second identifier.

11. The method of claim 10, further comprising:

displaying the first identifier, the second identifier, and the identifiers of the additional other products in a selection window of the browser window, wherein the selection window is a sub-portion of the browser window.

12. The method of claim 11 further comprising:

receiving a confirmation from the user of one or more of the identifiers displayed in the selection window, such that the confirmed identifiers are available for export from the browser window.

13. The method of claim 10 further comprising generating keywords for an on-line advertising campaign of the retailer based on the first identifier, the second identifier and the additional identifiers of the additional other products.

14. The method of claim 10 further comprising:

determining first coordinates of a pointer in the panel when the selection of the first identifier is received;

mapping the first coordinates to the first identifier;

determining second coordinates of the pointer in the panel when the selection of the second identifier is received;

mapping the second coordinates to the second identifier; and identifying the first and second identifier based on the mappings.

15. The method of claim 10, wherein the structured data includes markup language code and wherein the first objects and the second objects are identified within the markup language code by one or more markup tags.

16. A system including a graphical user interface configured to provide a rendering of structured data, the rendering including a plurality of items corresponding to a plurality of objects of the structured data, the system comprising:

one or more processors;

a selection handler configured to use the one or more processors to receive input indicating a user's selection of two or more items from the plurality of items;

a transparent panel on top of the rendering configured to use the one or more micro processors to capture the input indicating the selection of the two or more items, wherein the transparent panel prevents hyperlinks for items displayed under the panel from being invoked when selected through the transparent panel;

an object locator configured to use the one or more processors to determine two or more selected objects from the plurality of objects, the selected objects corresponding to the selected two or more items;

selection logic configured to use the one or more micro processors to determine one or more additional objects of the structured data associated with the selected objects; and a delivery engine configured to use the one or more processors to provide one or more additional items associated with the selected items, wherein the one or more additional items correspond to the one or more additional objects of the structured data.

17. The system of claim 16 wherein the delivery engine is configured to highlight the selected items and the one or more additional items on the rendering via the transparent panel.

18. The system of claim 16, further comprising:

a data parser configured to use the one or more processors to parse the structured data to determine metadata associated with each of the selected objects within the structured data; and a path assembler configured to use the one or more processors to determine a selection path based on a comparison of the metadata associated with each of the selected objects, the selection path including similarities amongst the metadata and at least one variant, wherein the selection logic is configured to determine the one or more additional objects of the structured data associated with the selected objects based on the selection path.

19. The system of claim 18 wherein the data parser is configured to determine a common ancestor node from the metadata associated with each of the selected objects, wherein the common ancestor precedes the variant in the selection path in a hierarchical relationship between objects of the structured data.

20. The system of claim 18 wherein the structured data includes markup language code and further comprising a browser configured to provide the rendering of the markup language code, wherein the object locator is configured to determine two or more selected objects from the plurality of objects corresponding to the selected two or more items in the markup language code, wherein the data parser is configured to parse the markup language code to determine metadata associated with each of the selected objects, the metadata including a sequence of one or more tags from the markup language code, wherein the path assembler is configured to determine the selection path based on a comparison of the metadata associated with each of the selected objects, the selection path including similarities amongst the metadata and at least one variant, wherein the selection logic is configured to determine the one or more additional objects of the markup language code associated with the selected objects based on the selection path, and wherein the delivery engine is configured to highlight one or more additional items associated with the selected items in the browser, wherein the one or more additional items correspond to the one or more additional objects of the markup language code.

* * * * *

UNITED STATES PATENT AND TRADEMARK OFFICE
CERTIFICATE OF CORRECTION

PATENT NO. : 8,341,176 B1
APPLICATION NO. : 13/481289
DATED : December 25, 2012
INVENTOR(S) : Kevin Rabsatt Page 1 of 1

It is certified that error appears in the above-identified patent and that said Letters Patent is hereby corrected as shown below:

In column 13, line 59, in claim 2, delete "the first" and insert -- in the first --, therefor.

In column 15, line 53, in claim 16, after "more" delete "micro".

In column 16, line 1, in claim 16, after "more" delete "micro".

Signed and Sealed this
Twenty-sixth Day of February, 2013

Teresa Stanek Rea
*Acting Director of the United States Patent and Trademark Office*